United States Patent
Weda et al.

(10) Patent No.: US 9,514,438 B2
(45) Date of Patent: Dec. 6, 2016

(54) METHOD AND SYSTEM FOR PROVIDING A REPORT OF EXPERIENCES OF MEMBERS OF A GROUP OF USERS

(75) Inventors: Johannes Weda, Eindhoven (NL); Mauro Barbieri, Eindhoven (NL); Pavankumar Murli Dadlani Mahtani, Eindhoven (NL); Pavlo Serhiyovych Mulyar, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 923 days.

(21) Appl. No.: 13/318,796

(22) PCT Filed: Apr. 29, 2010

(86) PCT No.: PCT/IB2010/051872
§ 371 (c)(1),
(2), (4) Date: Nov. 4, 2011

(87) PCT Pub. No.: WO2010/128436
PCT Pub. Date: Nov. 11, 2010

(65) Prior Publication Data
US 2012/0054292 A1   Mar. 1, 2012

(30) Foreign Application Priority Data
May 8, 2009 (EP) .................................. 09159724

(51) Int. Cl.
*G06F 15/16* (2006.01)
*G06F 3/00* (2006.01)
(Continued)

(52) U.S. Cl.
CPC ............... *G06Q 10/10* (2013.01); *G06F 17/30* (2013.01); *G06Q 50/01* (2013.01)

(58) Field of Classification Search
CPC ................................. G06Q 50/01; G06Q 30/02
(Continued)

(56) References Cited

U.S. PATENT DOCUMENTS 8,244,848 B1 * 8/2012 Narayanan ............. G06Q 50/01
709/218
8,321,456 B2 * 11/2012 Barbieri ............ G06F 17/30038
707/771
(Continued)

FOREIGN PATENT DOCUMENTS

WO      0077667 A2     12/2000
WO    WO0077667    *  12/2000
(Continued)

OTHER PUBLICATIONS

Coppens et al: "AmigoTV: Towards a Social TV Experience"; Proceedings of the 2nd European Conference on Interactive Television (2004), Vol. 36, Springer Publishing, pp. 1-4.

*Primary Examiner* — Kevin Bates
*Assistant Examiner* — Emad Siddiqi

(57) ABSTRACT

A method of providing a report of experiences of members of a group of users includes: making available a content data compilation compiled from at least items of content data obtained in association with different members of the group; —obtaining data associated with at least one member of the group; and using the data associated with at least one member to cause at least one message to be output on at least one device (8-11) associated with at least one member of the group. At least part of the content data compilation is based on information provided in response to the at least one message by the at least one member with whom the device (8-11) is associated. In one embodiment, a "family news reporter" scenario is proposed.

13 Claims, 3 Drawing Sheets

(51) Int. Cl.
*G06F 7/00* (2006.01)
*G06Q 10/10* (2012.01)
*G06Q 50/00* (2012.01)
*G06F 17/30* (2006.01)

(58) Field of Classification Search
USPC .......................................................... 709/206
See application file for complete search history.

(56) References Cited

U.S. PATENT DOCUMENTS

| 2007/0277196 | A1 | 11/2007 | Steengaard et al. | |
|---|---|---|---|---|
| 2008/0005168 | A1* | 1/2008 | Huff et al. | 707/104.1 |
| 2009/0063995 | A1* | 3/2009 | Baron | G06Q 10/10 715/753 |
| 2010/0042688 | A1* | 2/2010 | Maghraby | G06Q 30/0228 709/206 |

FOREIGN PATENT DOCUMENTS

| WO | 2006012202 A2 | 2/2006 |
|---|---|---|
| WO | 2007146111 A2 | 12/2007 |

* cited by examiner

METHOD AND SYSTEM FOR PROVIDING A REPORT OF EXPERIENCES OF MEMBERS OF A GROUP OF USERS

FIELD OF THE INVENTION

The invention relates to a method of providing a report of experiences of members of a group of users. The invention also relates to a system for providing a report of experiences of members of a group of users. The invention also relates to a computer program.

BACKGROUND OF THE INVENTION

WO 00/7767 A2 discloses a family information management system which facilitates communication between family members. The family information system includes a central control module which stores and processes information pertaining to members of a family. The central control module includes a database of family data files assigned to specific registered families. The family data file is preferably integrated into one holistic family information management application that can be accessed through any network through a variety of interface devices. The central control module is designed to permit the input and retrieval of information existing in several formats. It might also be possible for consumers to leave audio and video messages and reminders for other members of the family. The family information system employs a user interface system to update the central control module with relevant family information and to inform family members as to various relevant activities. The user interface system may employ Internet access via a two-way connection from a home PC, television or in-home screen, two-way radio or cellular communications. User interface devices also provide family members with the ability to receive reminders from the central control module regarding the status of important events, as well as to plan real-time changes input by another family member.

A problem of the known system is that it is primarily suited as a planning tool, but that it relies on voluntary submissions from family members to assemble information that family members can use to stay informed of their activities.

SUMMARY OF THE INVENTION

It is desirable to provide a method, system and computer program of the types defined above, that allow a group of people to share experiences so as to provide a feeling of being involved or at least informed in each others' lives.

This is achieved by the method of providing a report of experiences of members of a group of users according to the invention, which includes:
  making available a content data compilation compiled from at least items of content data obtained in association with different members of the group;
  obtaining data associated with at least one member of the group; and
  using the data associated with at least one member to cause at least one message to be output on at least one device associated with at least one member of the group, wherein
  at least part of the content data compilation is based on information provided in response to the at least one message by the at least one member with whom the at least one device is associated.

By making available a content data compilation compiled from at least items of content data obtained in association with different members of the group, members of the group can obtain a feeling of belonging, because the compilation shares information pertaining to the experiences of several members of the group. Because at least one message is caused to be output on at least one device associated with that at least one member and at least part of the content data compilation is based on information provided by that at least one member in response to the at least one message, the member is prompted to contribute to the compilation. This ensures that content data compilations created over time retain their function where otherwise members might lose interest in using the system to stay in touch. By using the data associated with that at least one member to cause the at least one message to be output on at least one device associated with at least one member, in particular the member with whom the data is associated, it can be ensured that the prompt is provided at a relevant time or with relevant content. Therefore, more meaningful information is obtained in response. This furthers the aim of providing a compilation that is not just limited to highlights that the members of the group would think to share anyway. In the present context, data is associated with a user if it is provided with information establishing a link to a particular set of one or more members of the group, for example because it has been submitted from a device known to be associated with a particular member of the group. Generally, the data used to cause a message to be provided is at least one of a content data item submitted for inclusion in the content data compilation by the associated member of the group and data representative of at least an aspect of a past, present or future activity associated with one or more members of the group.

In an embodiment of the method, the data used to cause at least one message to be output on at least one device associated with a member includes at least one of an item of content data obtained from that member and metadata associated with an item of content data obtained from that member.

In this embodiment, the system that provides the content data compilation is able to use the method to obtain information that provides a setting for the item of content data obtained. In particular, the information can be used to help determine where in the compilation the item of content data is to be placed. Alternatively or additionally, the information can be used to augment the item of content data with a commentary, introduction, caption or the like.

A variant of this embodiment includes analyzing at least one of the item of content data and metadata associated with the item of content data prior to providing the message.

The analysis can help the system carrying out the method to determine whether to send a message to the user, but also what kind of message. In the first case, the number of messages is limited. In the second case, more useful information is obtained, helping the system to provide a meaningful compilation.

In a further variant, the information provided in response to the at least one message is used to compose a part of the content data compilation including at least part of the item of content data obtained from that member.

In particular, the information can be combined with the item of content data or used to search for further items of content data to which the item of content data obtained from the member is related.

In a variant, the composed part is combined with data corresponding to at least part of the item of content data, and included in the content data compilation such as at least partly to overlap temporally when the content data compilation is rendered in perceptible form by a rendering system.

In this variant, a commentary on the item of content data, e.g. relating to the member's thoughts, feelings or experiences, is added to data corresponding to at least part of the item of content data submitted by the member. The report of experiences that the content data compilation provides thus becomes more meaningful for the other members of the group.

An embodiment of the method includes analyzing at least one of an item of content data and metadata associated with an item of content data to determine at least part of contents of the at least one message.

This embodiment provides the user with at least one pertinent question that will return meaningful information for combination with the item of content data. For example, the message can ask a user where he was at the date indicated in the metadata associated with a digital photograph submitted by him. Alternatively, in the case of direct image analysis, the message can use features in the scene depicted in the photograph to prompt the user to provide more information.

In an embodiment, the data associated with that at least one member of the group includes information representative of at least an aspect of at least one of:
  at least one activity undertaken by that at least one member and
  at least one activity scheduled for that at least one member.

This embodiment addresses the problem that many members of a group using a system to share experiences can't think of experiences they should share with others. Using this embodiment, the members can be provided with specific questions that point them towards certain items of information they should be providing. For example, if a sight-seeing trip has been scheduled for a particular date, the method automatically provides a reminder to submit photographs or home videos.

In a variant, the message is caused to be provided at a point in time after the activity has commenced.

This ensures that the reminder is used as a reminder to submit an item of content data relating to the event, rather than a reminder that the event is about to take place.

An embodiment of the method includes making the content data compilation available in a format for linear reproduction in perceptible form by a rendering system.

This embodiment addresses the problem that many users are not technologically versed enough to navigate through collections of files of content data, e.g. web-sites. The format for linear (i.e. sequential) reproduction in perceptible form allows passive perusal of the content data compilation. Navigation is not required. The content data compilation can be streamed over the Internet or transmitted on a television channel dedicated to the group of users.

An embodiment of the method includes creating the content data compilation by organizing data derived from the content data obtained in association with different members of the group on the basis of at least one of:
  an analysis of data included in the obtained content data;
  metadata associated with data included in the obtained content data;
  information provided by at least one member in response to at least one message caused to be output on at least one device associated with that at least one member using the data associated with at least one member;
  data representative of relations between members of the group; and
  data used to cause a message to be output on at least one device associated with at least one member in response to which at least one item of the content data has been received.

In particular in cases in which the content data compilation is made available in a format for linear reproduction in perceptible form by a rendering system, the items of content data have to be put in a certain order. By analyzing data included in the obtained content data, related material can be clustered together to establish such an order. Such types of analysis could include semantic clustering of text, facial recognition for visual material (images, video), audio analysis to identify audio or audiovisual material with the same voice, etc. Similarly, metadata associated with data included in the obtained content data can be used to cluster data corresponding to the various items of content data themselves. For example, the time and date of the material or geotags can be used to cluster related items of content data. Also, a user may tag an item of content data as having a high priority ("breaking news"). In case the analysis used to order the content data obtained in association with different members of the group includes analyzing information provided by at least one member in response to at least one message caused to be output on at least one device associated with that at least one member using the data associated with that at least one member, the message can be used to obtain information specifically intended for clustering items of content data submitted by the members. The data used to cause a message to be output on at least one device associated with at least one member in response to which at least one item of the content data has been received can also be used, since it is to be expected that the item of content data will bear some relationship to the information that gave rise to the message. For instance, where a message is generated because a member's calendar shows that he or she undertook a particular activity on a particular day, then the date can be associated with an image file submitted by the member in response to the message. Finally, data representative of relations between members of the group can be used to order content items submitted by the members according to status attributes of the submitters. Social distance between members can be used as a clustering criterion.

An embodiment of the method includes augmenting the content data compilation with data based on a model of a person.

This type of data can be used to create a content data compilation with less abrupt changes between parts originating from different members. The model of a person will include one or more of an audio and a video component, depending on the particular type of content data compilation. The audio component will in particular comprise a voice of a person, e.g. one of the members or a neutral presenter. Information created or obtained by the system making the content data compilation available can be used to provide the semantic content of the audio output, which is then provided in a particular form using the model of the member or neutral presenter. This type of output can be a voice-over or an announcement in between parts of the content data compilation. Similarly, a video component of a person will generally be an avatar. In one embodiment, the avatar is superimposed on the video component of a section of the content data compilation to provide additional commentary. In another embodiment, the avatar is provided in a section of the content data compilation bridging parts corresponding to different items of content data obtained in association with different respective members.

According to another aspect of the invention, there is provided a system for providing a report of experiences of members of a group of users, including:

a processing system for composing a content data compilation compiled from at least items of content data obtained by the system in association with different members of the group; and an interface for making the compilation available for rendering in perceptible form to a rendering system, wherein the system is arranged:

to obtain data associated with at least one member of the group;

to use the data associated with at least one member of the group to cause at least one message to be output on at least one device associated with at least one member of the group; and to cause at least part of the compilation to be based on information provided by that at least one member in response to the at least one message.

The system automatically compiles a content data compilation based on inputs from different members of a group of users, which inputs include content data items and information provided in response to messages from the system. It ensures that the members provide meaningful input, so that the content data compilation provides a sense of community to persons looking at or listening to the content data compilation.

In an embodiment, the system is configured to carry out a method according to the invention.

According to another aspect of the invention, there is provided a computer program including a set of instructions capable, when incorporated in a machine-readable medium, of causing a system having information processing capabilities to perform a method according to the invention.

BRIEF DESCRIPTION OF THE DRAWINGS

The invention will now be explained in further detail with reference to the accompanying drawings, in which.

DETAILED DESCRIPTION

Figure 1:
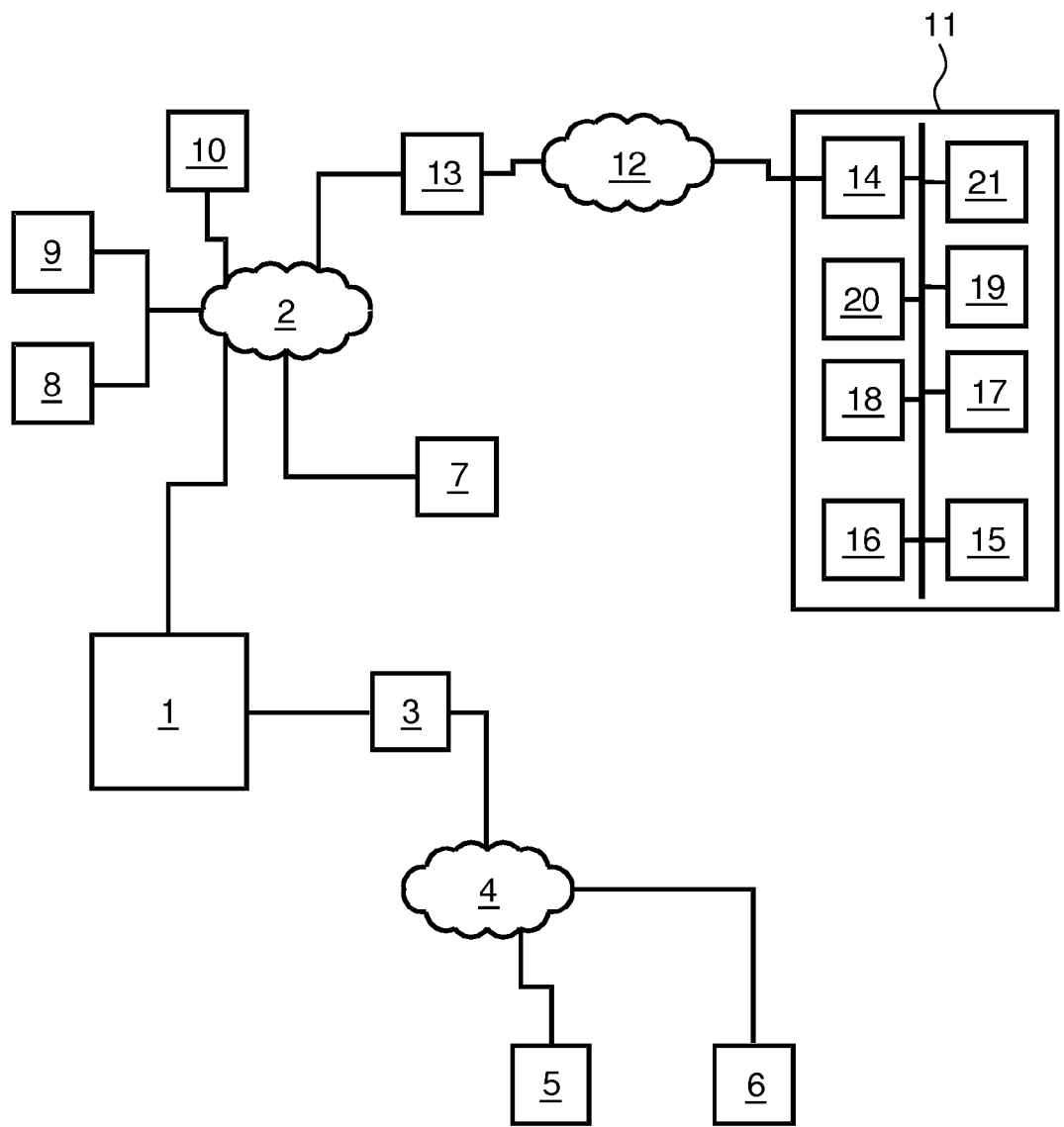
FIG. 1 is a schematic diagram of a system for providing a stream of audiovisual data compiled at least partly from contributions made by members of a group of users.

An assembly of networked systems as illustrated in FIG. 1 is described here for the purpose of enabling members of a group, in particular members of a family, to keep up to date with other members' experiences. For conciseness, reference will be made to family members, on the understanding that members of another type of group (employees of a company, students in the same class, etc.) can equally use the technology to stay informed of other members' experiences.

The system described below assists geographically dispersed family members to keep up date with other members' activities. In the modern society, the personal independence of people and busy schedules sometimes have a negative effect on interaction with the family, and family members may be restricted from being together or frequent communication for many reasons. In particular, it allows parents with grown-up children to learn about the whereabouts and experiences of their children or grandchildren. It provides a compilation of content data that can be accessed by those parents with minimal effort, and that achieves an enhanced sense of connectedness compared with methods of communication such as SMS (short message service), photo and video slideshows and the like. It also does not rely solely on the family members submitting items of data such as e-mails, photographs or videos at relevant and frequent points in time. Instead, the system actively finds out the family news by interviewing family members and stimulating the submission of content to the system. The interview questions help the family members to remember what they did during the day and what experiences they had that are likely to be of interest to others. Thus, the system stimulates the submission of content to the system and keeps the use frequency constant over time. The system presents the family news as a channel similar to a television channel, or e.g. via a photo-frame upon availability or when a receiving person requests for "family news". This allows family members such as parents and grandparents to access the family news in a lean-back mode. Complicated interaction with the system to gain access to the family news is not required.

In the embodiment to be described below, the family news is presented by an animated avatar corresponding to a virtual family news reporter. By adding the virtual family news reporter as an avatar, the presentation of the family news turns from a slideshow into a more life-like and pleasant-to-watch composition of family news that keeps the audience interested. In an embodiment, the family news report is embedded in a news program obtained from an external source, so that the family news becomes part of the world news.

Turning to the schematic diagram of FIG. 1, a news reporter system 1 is connected to a Very Large Area Network 2, e.g. the Internet. The system 1 typically comprises a data processing system having at least one data processing unit, memory and data storage devices (not shown). It further includes an interface (not shown) to a transmission station 3 for providing video transmissions over a broadcast network 4 to digital television receivers 5,6. The video transmission may be on demand, a multicast transmission or a broadcast transmission. In embodiments, the family news channel is encrypted so that only users of the digital television receivers 5,6 with a required access token (e.g. a password, smart card or the like) can watch the family news channel. Additionally or alternatively, the family news reporter system 1 can make the family news available for download as a stream of audiovisual data over the network 2, for example to a personal computer 7 with internet access. In yet another embodiment, the family news reporter system 1 is operated by a hotel or company, so that the broadcast network 4 in fact corresponds to an in-house network. In yet a further embodiment, the family news is alternatively or additionally made available as a compilation printed in a newspaper, optionally in combination with other news. Thus, a hotel or conference centre may provide guests with a personalized newspaper containing family news and world news.

Returning to FIG. 1, the family news reporter system 1 obtains items of content data from devices communicating with it via the network 2. Three computing devices 8-10 connected directly to the network 2 are shown in FIG. 1 by way of example. A smart phone 11 is connected to the network 2 via a cellular telephone network 12 and gateway 13, and can similarly be used to submit items of content data.

The smart phone 11 includes a transceiver 14 for exchanging data, including voice data, via the cellular telephone network 12. It further includes a GPS receiver 15 for providing data representative of a current location of the smart phone 11. A camera 16 is provided for recording digital images, including a sequence of digital images forming a video. Voice communications are carried out using a microphone 17 and speaker 18. In the schematically illustrated embodiment, the smart phone 11 further includes a data processing unit 19 and memory 20, as well as a visual display unit 21, in certain embodiments comprising a touch screen interface.

Using the smart phone 11, a user can submit items of content data, in particular files comprising at least one of audio, video, text and image data, to the family news reporter system 1. Depending on the capabilities of the smart phone 11, the items of content data are submitted in an MMS (Multimedia Messaging System) message, e-mail, as an upload via a web interface or via a proprietary interface. They are associated with the identity of the user of the smart phone 11, either through an identification of the smart phone 11 itself (e.g. a network address or telephone number) or because the user has provided a user name to the smart phone 11. For those items of content data submitted spontaneously by the user, the family news reporter system 1 is provided with an interface that enables it to link the item of content data to the associated family member through data provided with the item of content data. For those items of content data provided at the instigation of the family news reporter system 1, the family news reporter system 1 will already be aware of the identity of the family member submitting the item of content data. The user has the option of tagging an item of content data as "breaking news", which will result in its receiving priority when the family news report is compiled and/or in appropriate additional data being added to that part of the family news report (e.g. a special announcement as a voice-over to a video clip).

In an embodiment, the smart phone 11 is configured automatically to provide items of content data or other information to the family news reporter system 1 through appropriate software installed on the smart phone 11. Thus, location data generated by the GPS receiver can be submitted, a user's calendar can be synchronized, or images and videos stored in memory 20 can be uploaded automatically. In an alternative embodiment, other contextual data including the ambient temperature or other climate parameters can be transmitted automatically. In yet another embodiment, the smart phone 11 is configured to detect devices associated with other family members in its environment, and this information is transmitted to the family news reporter system 1.

Figure 2:
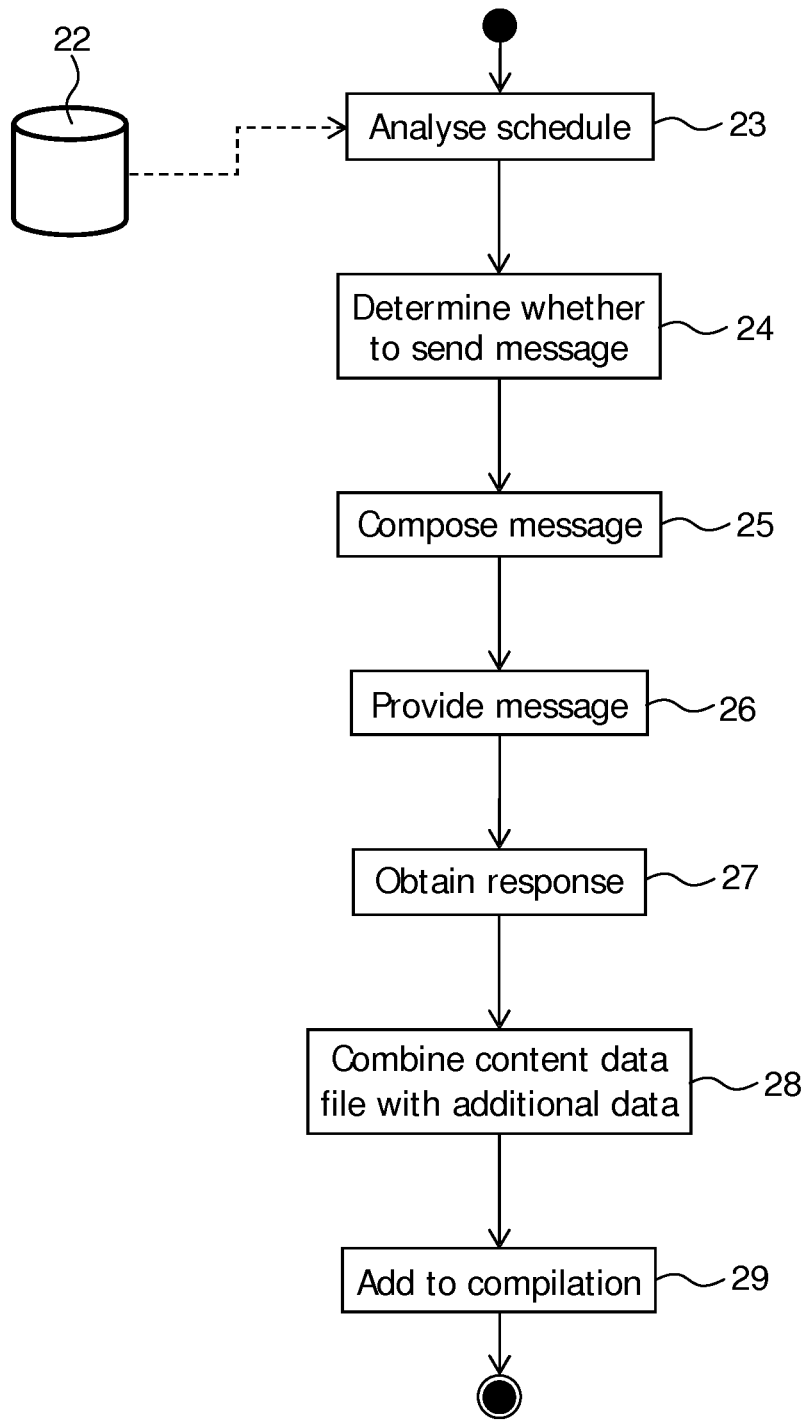
FIG. 2 is a flow chart of a method used to obtain contributions from a member of the group.

The family news reporter system 1 is arranged to obtain contributions from the family members in a dialogue. FIG. 2 illustrates a first type of dialogue, in which the family news reporter system 1 sends a request to a family member to upload an item of content data, in particular a request to submit a file containing at least one of audio, video, text and image data.

In the illustrated embodiment, the family news reporter system 1 maintains a database 22 including schedules for the respective family members. Each schedule includes information representative of at least an aspect of activities undertaken or planned by the family member concerned. Aspects include the starting time, the end time, the date, the type of activity, the location, the identity of other persons involved, etc. The family news reporter system is able to maintain such a schedule by synchronizing the schedule with calendars and other data stored by the smart phone 11 and the computing devices 8-10. In another embodiment, the database 22 includes further data associated with at least one member of the group in the form of logs of usage of a device associated with that member of the group. For example, the database 22 can periodically be updated with a list of pictures taken with the camera 16 of the smart phone 11. Such updates can take place automatically.

The family news reporter system 1 analyses (step 23) the information in the database 22 associated with a particular user, for example the user of the smart phone 11. Such an analysis can, for example, be carried out at regular intervals. Based on the analysis, the family news reporter system 1 determines (step 24) whether to request an item of content data from the family member concerned. Factors determining whether a request is to be sent, include whether and how many items of content data have already been received, whether there have been any recent activities or whether an activity is currently ongoing, etc. Rather than remind the family member of planned activities, the family news reporter system 1 serves to remind the family member to send a contribution to the family news channel. Therefore, the system 1 makes a positive determination only after the activity has commenced, in some circumstances only after it has been completed. In an embodiment, the family news reporter system 1 uses information other than the time of the activity to determine whether to provide a message during or after the activity. In an embodiment, this step 24 includes determining to whom messages are to be sent. Thus, if the schedule indicates that multiple family members engaged in a common activity, they can each be sent a message.

If it is decided to send a message, then the message is composed (step 25). The composition of the message varies according to the results of the analysis carried out in the preceding step 23. The message is thus composed to refer to the data on which the determination that the message is to be sent was based. For example, the message can ask the use to submit an item of content data related to a particular activity in the schedule by referring to the date and time or the location of the activity.

The message is then provided (step 26) in a suitable format to, for example, the user of the smart phone 11. The modality chosen to provide the message can vary. Thus, in one embodiment, the user receives a phone call, and the message is provided using a text-to-speech converter. In another embodiment, the user receives a text message on the display unit 21 of the smart phone 11. In an advanced embodiment, an avatar representing the family news reporter is caused to appear on the display unit 21 to provide the message to the user.

The family news reporter system 1 receives information in the form of an item of content data, in particular a file containing at least one of audio, video, text and image data, in response to the message (step 27). This item of content data is then combined (step 28) with additional data to form a section of the family news program. In particular, the data used to cause the message provided in the previous step 26 can be used to provide sub-titles or a voice-over to the item of content data. This part is then added to the compilation that will form the family news report (step 29). This step 29 will be explained in further detail below, after a further method of obtaining information from a family member has been described with reference to FIG. 3.

Figure 3:
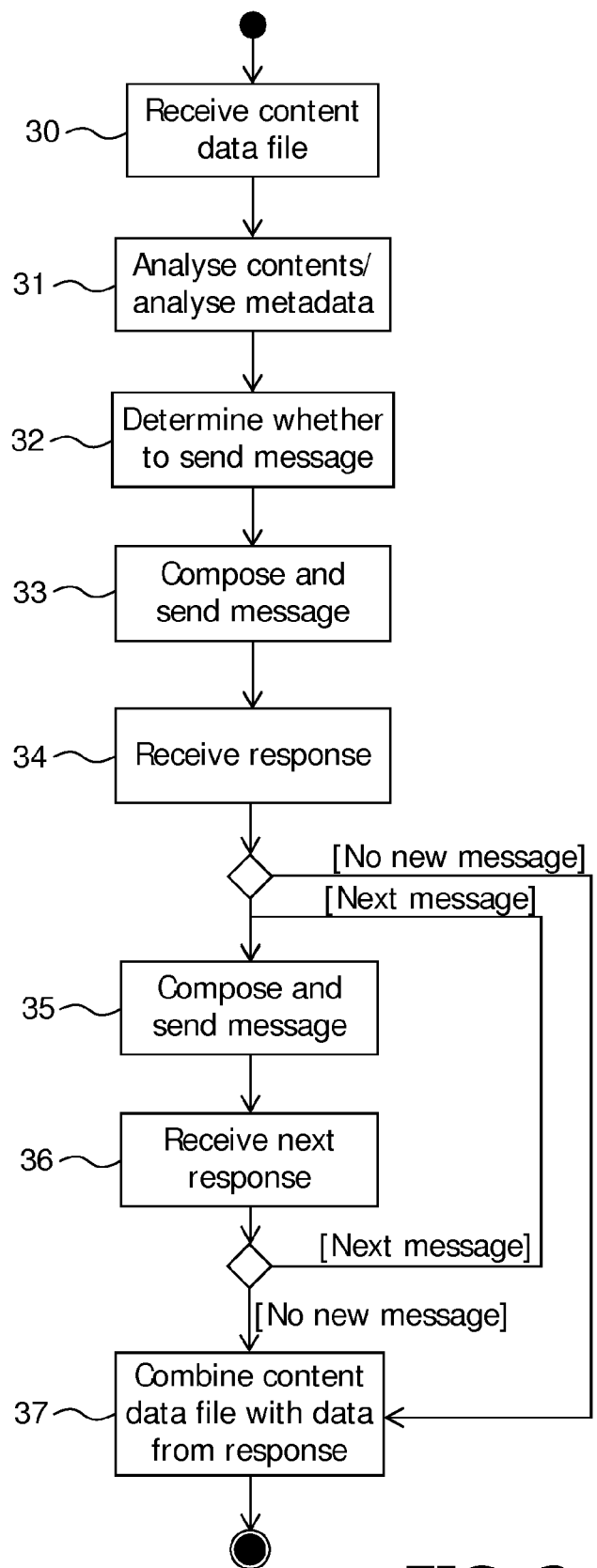
FIG. 3 is a flow chart of a method used to obtain additional information relating to a contribution made by a member of the group.

FIG. 3 shows a dialogue between the family news reporter system 1 and the family member after the family member has submitted an item of content data, in particular a file containing at least one of audio, video, text and image data, either of his own accord or after the first five steps 23-27 of the method of FIG. 2 have been carried out.

Having received the item of content data (step 30), the family news reporter system 1 proceeds to analyze (step 31) at least one of data included in the obtained content data and metadata associated with data included in the obtained content data. In the case of an image file, the analysis can be image analysis to determine, for example, whether there are any buildings in the picture or facial recognition analysis to determine whether any known persons are in the image. In the case of a file containing audio information, voice recognition can be applied to determine who is talking.

Next, (step 32) the family news reporter system 1 determines whether to send a message to the family member, e.g. to the smart phone 11. This determination is based on the results of the analysis of the preceding step 31. For example, if a building is determined to be present in the picture, but the system 1 is unable to recognize it, then it will determine that a message should be sent to the user. Similarly, if it is determined that the voice in an audio track is not that of the user, the family news reporter 1 can determine that it is appropriate to ask who the speaker was or what the relation between the speaker and the family member is.

If it is determined that a message is to be sent, then the message is composed (step 33) and sent. The composition of the message also depends on the analysis made in the preceding step 31, so that at least one of an item of content data obtained from the member and metadata associated with an item of content data obtained from the member is used to determine that contents of a message caused to be output on at least one device associated with the family member.

In one embodiment, the family member receives a text message. In another embodiment, the family news reporter system 1 uses a model of a fictional person, (the family news reporter), and text-to-speech conversion technology to provide a voice message to the family member. The family news reporter system 1 can call the smart phone 11, for example.

The user then provides a response (step 34) with the requested information. The response can be in the form of a text message or a voice message. The family news reporter system 1 processes the information after performing speech recognition on the response.

In the illustrated embodiment, provision is made for a dialogue, depending on the response obtained from the family member. In this variant, the family news reporter system 1 analyses the response to determine whether a further message to the family member (or indeed to another family member) is desirable or necessary. If so, the family news reporter system 1 composes and sends a further message (step 35) and obtains a further response (step 36) from the family member.

If no further messages are to be sent or received, the data from the response or responses are combined (step 37) with the item of content data received in the first step 30 to create a part of the content data compilation that is to form the family news report.

In a variant, the last step 37 is included within the recursive loop, in the sense that a live commentary can be provided by a family member on a video or other item of content data submitted by him or her, the messages and response being transmitted almost in real-time on the family news channel.

Where the family news report is first composed and then aired, the last step 37 shown in FIG. 3 is followed by a step like the last step 29 shown in FIG. 2, in which the parts based on different items of content data submitted by different family members are combined into the final content data compilation, wherein additional material not submitted by any family member can be added as well. In this step 29, the family news reporter system 1 assembles all the inputs (items of content data and responses to messages) and composes a news program out of it. This includes using technology such as speech recognition and face recognition to cluster and link related material together. The links are based on at least one of the time and data of the material, geotags associated with the material, semantic clustering of text input, links established between related faces in visual material (images and videos) and links established between related voices in audio material.

In order to make the news program more interesting, a virtual family news reporter presents the news. The material is augmented with data based on a model of a person. In the case of a family news program this is an avatar. The information obtained as a result of analyzing the items of content data and associated metadata, as well as scheduling data from the database 22 and information obtained in response to the messages is used to provide the semantic component of the output of the avatar.

In addition, transitions between items of content data, in particular transitions comprising visual information, are added. As mentioned, a special type of transition can be provided to items of content data marked as high-priority or "breaking news".

The result is an audiovisual content data compilation that can be streamed to family members, in particular parents and grandparents for rendering in a linear manner, thus requiring no navigation through the information.

It should be noted that the above-mentioned embodiments illustrate, rather than limit, the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The functions performed by the family news reporter system 1 could also be performed locally on the computing devices 8,9 or the smart phone 11. In particular, one of the computing devices 8,9 or the smart phone 11 can collect the contributions from other group members and make the content data compilation available locally only.

A particular user can belong to several social groups. To accommodate for this, people can have more than one news channel or subscribe to news items from multiple persons. The family news reporter system 1 can make news programs for multiple groups available. In one embodiment, a single user's contributions are used to create content data compilations for multiple groups of which the user is a member.

The invention claimed is:

1. A method of providing a report of experiences of members of a group of users, comprising:
    making available a content data compilation, wherein the content data compilation is compiled from at least items of content data obtained in association with different members of the group;
    obtaining data associated with at least one member of the group; and using the obtained data associated with at least one member to cause at least one message to be output on at least one device associated with at least one member of the group, wherein at least part of the content data compilation is based on information provided in response to the at least one message by the at least one member with whom the at least one device is associated, wherein further the information is used for determining where in an order of the content data compilation an item of content data obtained in association with the at least one member is to be placed, further wherein related items of content data are clustered together to establish the order of the content data compilation.

2. The method according to claim 1, wherein the data used to cause at least one message to be output on at least one device associated with a member includes at least one of an item of content data obtained from that member and metadata associated with an item of content data obtained from that member.

3. The method according to claim 2, including analyzing at least one of the item of content data and metadata associated with the item of content data prior to providing the message.

4. The method according to claim 2, wherein the information provided in response to the at least one message is used to compose a part of the content data compilation including at least part of the item of content data obtained from that member.

5. The method according to claim 4, wherein the composed part is combined with data corresponding to at least part of the item of content data, and included in the content data compilation such as at least partly to overlap temporally when the content data compilation is rendered in perceptible form by a rendering system.

6. The method according to claim 1, including analyzing at least one of an item of content data and metadata associated with an item of content data to determine at least part of contents of the at least one message.

7. The method according to claim 1, wherein the obtained data associated with that at least one member of the group includes information representative of at least an aspect of at least one of:

at least one activity undertaken by that at least one member and at least one activity scheduled for that at least one member.

8. The method according to claim 7, wherein the message is caused to be provided at a point in time after the activity has commenced.

9. The method according to claim 1, including making the content data compilation available in a format for linear reproduction in perceptible form by a rendering system.

10. The method according to claim 1, including creating the content data compilation by organizing data derived from the items of content data obtained in association with different members of the group on the basis of at least one of:

an analysis of data included in the obtained items of content data;

metadata associated with data included in the obtained items of content data;

information provided by at least one member in response to at least one message caused to be output on at least one device associated with that at least one member using the data associated with at least one member;

data representative of relations between members of the group; and data used to cause a message to be output on at least one device associated with at least one member in response to which at least one item of the content data has been received.

11. The method according to claim 1, including augmenting the content data compilation with data based on a model of a person.

12. A system for providing a report of experiences of members of a group of users, comprising:

a processing system for composing a content data compilation compiled from at least items of content data obtained by the system in association with different members of the group; and an interface for making the content data compilation available for rendering in perceptible form to a rendering system, wherein the system is arranged:

to obtain data associated with at least one member of the group;

to use the obtained data associated with at least one member of the group to cause at least one message to be output on at least one device associated with at least one member of the group; and to cause at least part of the content data compilation to be based on information provided by that at least one member in response to the at least one message, wherein further the information is used for determining where in an order of the content data compilation an item of content data obtained in association with the at least one member is to be placed, further wherein related items of content data are clustered together to establish the order of the content data compilation.

13. A computer program including a set of instructions capable, when incorporated in a non-transient machine-readable medium, of causing a system having information processing capabilities to perform a method according to claim 1.

* * * * *